(12) United States Patent
Babin

(10) Patent No.: US 7,128,566 B2
(45) Date of Patent: Oct. 31, 2006

(54) VALVE PIN GUIDING TIP FOR A NOZZLE

(75) Inventor: Denis Babin, Georgetown (CA)

(73) Assignee: Mold-Masters Limited, Georgetown (CA)

( * ) Notice: Subject to any disclaimer, the term of this patent is extended or adjusted under 35 U.S.C. 154(b) by 259 days.

(21) Appl. No.: 10/699,867

(22) Filed: Nov. 4, 2003

(65) Prior Publication Data
US 2004/0146598 A1 Jul. 29, 2004

(51) Int. Cl.
*B29C 45/23* (2006.01)
(52) U.S. Cl. ...................................... 425/562; 425/564
(58) Field of Classification Search ......... 425/562–566
See application file for complete search history.

(56) References Cited

U.S. PATENT DOCUMENTS

| | | |
|---|---|---|
| 2,865,050 A | 12/1958 | Strauss |
| 3,488,810 A | 1/1970 | Gellert |
| 3,677,682 A | 7/1972 | Putkowski |
| 3,716,318 A | 2/1973 | Erik et al. |
| 3,741,704 A | 6/1973 | Beasley |
| 3,952,927 A | 4/1976 | Schaumburg et al. |
| 4,004,871 A | 1/1977 | Hardy |
| 4,010,903 A | 3/1977 | Sakuri et al. |
| 4,013,393 A | 3/1977 | Gellert |
| 4,043,740 A | 8/1977 | Gellert |
| 4,053,271 A | 10/1977 | Gellert |
| 4,173,448 A | 11/1979 | Rees et al. |
| 4,212,627 A | 7/1980 | Gellert |
| 4,268,240 A | 5/1981 | Rees et al. |
| 4,268,241 A | 5/1981 | Rees et al. |
| 4,279,588 A | 7/1981 | Gellert |
| 4,286,941 A | 9/1981 | Gellert |
| 4,306,852 A | 12/1981 | Mateev et al. |
| 4,312,630 A | 1/1982 | Travaglini |
| 4,318,686 A | 3/1982 | Morgan |
| 4,330,258 A | 5/1982 | Gellert |
| 4,368,028 A | 1/1983 | Grish et al. |
| 4,412,807 A | 11/1983 | York |
| 4,450,999 A | 5/1984 | Gellert |

(Continued)

FOREIGN PATENT DOCUMENTS

CA 2082700 5/1994

(Continued)

OTHER PUBLICATIONS

PCT Search Report for WO 03/70446 (Application No. PCT/CA03/00244), dated May 16, 2003.

(Continued)

*Primary Examiner*—Tim Heibrink
(74) *Attorney, Agent, or Firm*—Sterne Kessler Goldstein & Fox PLLC

(57) ABSTRACT

An injection molding apparatus includes a manifold and a nozzle, which is received in an opening in a mold plate, including a nozzle channel for receiving the melt stream from the manifold channel, the nozzle channel being aligned with a first axis. A nozzle tip is received in a downstream end of the nozzle. The nozzle tip includes a melt channel for receiving the melt stream from the nozzle channel of the nozzle. A valve pin guiding portion is provided at a downstream end of the nozzle tip including an outwardly extending flange having a peripheral edge that abuts an inner wall of the opening to align the melt channel with a second axis through a mold gate. A valve pin is movable through the melt channel to selectively open the mold gate. Wherein the nozzle tip is flexible in order to compensate for the first axis and the second axis being out of alignment.

22 Claims, 11 Drawing Sheets

U.S. PATENT DOCUMENTS

| | | | |
|---|---|---|---|
| 4,517,453 A | 5/1985 | Tsutsumi | |
| 4,652,230 A | 3/1987 | Osuna-Diaz | |
| 4,662,837 A | 5/1987 | Anderson | |
| 4,768,283 A | 9/1988 | Gellert | |
| 4,768,945 A | 9/1988 | Schmidt et al. | |
| 4,771,164 A | 9/1988 | Gellert | |
| 4,781,572 A | 11/1988 | Boring | |
| 4,787,836 A | 11/1988 | Osuna-Diaz et al. | |
| 4,832,593 A | 5/1989 | Brown | |
| 4,875,848 A | 10/1989 | Gellert | |
| 4,902,218 A | 2/1990 | Leonard et al. | |
| 4,911,636 A | 3/1990 | Gellert | |
| 4,925,384 A | 5/1990 | Manner | |
| 4,945,630 A | 8/1990 | Gellert | |
| 4,950,154 A | 8/1990 | Moberg | |
| 4,954,072 A | 9/1990 | Zimmerman | |
| 4,981,431 A | 1/1991 | Schmidt | |
| 5,015,170 A | 5/1991 | Gellert | |
| 5,028,227 A | 7/1991 | Gellert et al. | |
| 5,030,084 A | 7/1991 | Gellert et al. | |
| 5,053,271 A | 10/1991 | Mori et al. | |
| 5,067,893 A | 11/1991 | Osuna-Diaz | |
| 5,135,377 A | 8/1992 | Gellert | |
| 5,139,724 A | 8/1992 | Hofstetter et al. | |
| 5,141,696 A | 8/1992 | Osuna-Diaz | |
| 5,208,052 A | 5/1993 | Schmidt et al. | |
| 5,208,228 A | 5/1993 | Ok et al. | |
| 5,238,378 A | 8/1993 | Gellert | |
| 5,254,305 A | 10/1993 | Fernandez et al. | |
| 5,268,184 A | 12/1993 | Gellert | |
| 5,269,677 A | 12/1993 | Gauler | |
| 5,299,928 A | 4/1994 | Gellert | |
| 5,324,191 A | 6/1994 | Schmidt | |
| 5,334,008 A | 8/1994 | Gellert | |
| 5,360,333 A | 11/1994 | Schmidt | |
| 5,374,182 A | 12/1994 | Gessner | |
| 5,421,716 A | 6/1995 | Gellert | |
| 5,443,381 A | 8/1995 | Gellert | |
| 5,474,439 A | 12/1995 | McGrevy | |
| 5,492,467 A | 2/1996 | Hume et al. | |
| 5,501,594 A | 3/1996 | Glozer et al. | |
| 5,505,613 A | 4/1996 | Krummenacher | |
| 5,518,393 A | 5/1996 | Gessner | |
| 5,545,028 A | 8/1996 | Hume et al. | |
| 5,554,395 A | 9/1996 | Hume et al. | |
| 5,569,475 A | 10/1996 | Adas et al. | |
| 5,652,003 A | 7/1997 | Gellert | |
| 5,658,604 A | 8/1997 | Gellert et al. | |
| 5,674,439 A | 10/1997 | Hume et al. | |
| 5,686,122 A | 11/1997 | Huntington et al. | |
| 5,695,793 A | 12/1997 | Bauer | |
| 5,700,499 A | 12/1997 | Bauer | |
| 5,707,667 A | 1/1998 | Galt et al. | |
| 5,736,171 A | 4/1998 | McGrevy | |
| 5,795,599 A | 8/1998 | Gellert | |
| 5,804,228 A | 9/1998 | Kofsman et al. | |
| 5,811,140 A | 9/1998 | Manner | |
| 5,820,899 A | 10/1998 | Gellert et al. | |
| 5,834,041 A | 11/1998 | Sekine et al. | |
| 5,845,853 A | 12/1998 | Friedman | |
| 5,849,343 A | 12/1998 | Gellert et al. | |
| 5,871,785 A | 2/1999 | Van Boekel | |
| 5,871,786 A | 2/1999 | Hume et al. | |
| 5,879,727 A | 3/1999 | Puri | |
| 5,885,628 A | 3/1999 | Swenson et al. | |
| 5,894,025 A | 4/1999 | Lee et al. | |
| 5,895,669 A | 4/1999 | Seres, Jr. et al. | |
| 5,925,386 A | 7/1999 | Moberg | |
| 5,941,637 A | 8/1999 | Maurer | |
| 5,948,450 A | 9/1999 | Swenson et al. | |
| 5,955,121 A | 9/1999 | Gellert et al. | |
| 5,980,234 A | 11/1999 | Harley | |
| 5,980,237 A | 11/1999 | Swenson et al. | |
| 5,984,661 A | 11/1999 | Vorkoper | |
| 6,003,182 A | 12/1999 | Song | |
| 6,009,616 A | 1/2000 | Gellert | |
| 6,017,209 A | 1/2000 | Gellert et al. | |
| 6,022,210 A | 2/2000 | Gunther | |
| 6,030,202 A | 2/2000 | Gellert et al. | |
| 6,036,467 A | 3/2000 | Jameson | |
| 6,050,806 A | 4/2000 | Ko | |
| 6,074,195 A | 6/2000 | Belous | |
| 6,089,468 A | 7/2000 | Bouti | |
| 6,113,381 A | 9/2000 | Gellert et al. | |
| 6,135,757 A | 10/2000 | Jenko | |
| 6,143,358 A | 11/2000 | Singh et al. | |
| 6,164,945 A | 12/2000 | Ishikashi et al. | |
| 6,164,954 A | 12/2000 | Mortazavi et al. | |
| 6,220,851 B1 | 4/2001 | Jenko | |
| 6,227,461 B1 | 5/2001 | Schroeder et al. | |
| 6,234,783 B1 | 5/2001 | Shibata et al. | |
| 6,245,278 B1 | 6/2001 | Lausenhammer et al. | |
| 6,254,377 B1 | 7/2001 | Kazmer et al. | |
| 6,261,084 B1 | 7/2001 | Schmidt | |
| 6,264,460 B1 | 7/2001 | Wright et al. | |
| 6,273,706 B1 | 8/2001 | Gunther | |
| 6,287,107 B1 | 9/2001 | Kazmer et al. | |
| 6,309,208 B1 | 10/2001 | Kazmer et al. | |
| 6,315,549 B1 | 11/2001 | Jenko et al. | |
| 6,318,990 B1 | 11/2001 | Gellert et al. | |
| 6,331,106 B1 | 12/2001 | Helldin | |
| 6,358,038 B1 | 3/2002 | Rozenberg | |
| 6,358,039 B1 | 3/2002 | Manner et al. | |
| 6,394,785 B1 | 5/2002 | Ciccone | |
| 6,419,116 B1 | 7/2002 | Eigler et al. | |
| 6,428,305 B1 | 8/2002 | Jenko | |
| 6,533,571 B1 | 3/2003 | Fikani | |
| 6,609,902 B1 | 8/2003 | Blais et al. | |
| 6,709,262 B1 | 3/2004 | Fong | |
| 6,726,467 B1 | 4/2004 | Lefebure | |
| 6,769,901 B1 * | 8/2004 | Babin et al. | 425/564 |
| 6,789,745 B1 | 9/2004 | Babin et al. | |
| 6,821,112 B1 | 11/2004 | Eigler et al. | |
| 6,832,909 B1 | 12/2004 | Bazzo et al. | |
| 6,869,276 B1 | 3/2005 | Babin et al. | |
| 6,921,257 B1 | 7/2005 | Olaru | |
| 6,921,259 B1 | 7/2005 | Gellert | |
| 6,962,492 B1 | 11/2005 | Olaru | |
| 6,971,869 B1 | 12/2005 | Olaru | |
| 6,988,883 B1 | 1/2006 | Babin et al. | |
| 2003/0008034 A1 | 1/2003 | Niewels | |
| 2003/0170340 A1 | 9/2003 | Sicilia et al. | |
| 2003/0235638 A1 | 12/2003 | Gellert | |
| 2004/0058031 A1 | 3/2004 | Niewels | |
| 2004/0071817 A1 | 4/2004 | Fischer et al. | |
| 2004/0131721 A1 | 7/2004 | Babin et al. | |
| 2004/0137107 A1 | 7/2004 | Babin et al. | |
| 2004/0146598 A1 | 7/2004 | Sicilia et al. | |
| 2004/0208949 A1 | 10/2004 | Niewels | |
| 2004/0258788 A1 | 12/2004 | Olaru | |
| 2005/0106283 A1 | 5/2005 | Olaru | |
| 2005/0118298 A1 | 6/2005 | Babin et al. | |
| 2005/0136151 A1 | 6/2005 | Babin et al. | |
| 2005/0214403 A1 | 9/2005 | Olaru | |

FOREIGN PATENT DOCUMENTS

| | | |
|---|---|---|
| CA | 2190569 | 5/1998 |
| CA | 2261367 | 8/2000 |
| CA | 2358148 | 3/2003 |
| CA | 2473920 | 8/2003 |
| DE | 3245571 A1 | 6/1984 |
| DE | 29602484 U1 | 5/1996 |
| DE | 19608676 C1 | 1/1997 |

| | | | |
|---|---|---|---|
| DE | 100 08 722 A1 | 8/2001 |
| DE | 100 37 739 A1 | 2/2002 |
| EP | 0 590 677 A1 | 4/1994 |
| EP | 0638407 A1 | 2/1995 |
| EP | 0 743 158 A1 | 11/1996 |
| EP | 0750975 A1 | 1/1997 |
| EP | 0 835 176 B1 | 4/1998 |
| EP | 0873841 A2 | 10/1998 |
| EP | 0 920 969 A1 | 6/1999 |
| EP | 0 743 158 B1 | 8/1999 |
| EP | 0962296 A2 | 12/1999 |
| EP | 1188537 A2 | 3/2002 |
| EP | 1 321 274 A1 | 6/2003 |
| FR | 2537497 | 6/1994 |
| GB | 1 540 698 | 2/1979 |
| JP | 5-177664 | 7/1993 |
| JP | 5-261770 | 10/1993 |
| JP | 5-309695 | 11/1993 |
| JP | 06-143358 | 5/1994 |
| JP | 7-148786 | 6/1995 |
| JP | 07-148786 | 6/1995 |
| JP | 8-90598 | 4/1996 |
| JP | 09-123222 | 5/1997 |
| JP | 10-034708 | 2/1998 |
| JP | 10-264222 | 10/1998 |
| JP | 10-296798 | 11/1998 |
| JP | 11-254488 | 9/1999 |
| JP | 2002-273768 | 9/2002 |
| JP | 2002-307492 | 10/2002 |
| JP | 2003-11173 | 1/2003 |
| JP | 2003-11174 | 1/2003 |
| JP | 2003-11176 | 1/2003 |
| JP | 2003-071873 | 3/2003 |
| WO | WO 84/00922 | 3/1984 |
| WO | WO 97/02129 | 1/1997 |
| WO | WO 00/48814 | 8/2000 |
| WO | WO 01/28750 A1 | 4/2001 |
| WO | WO 01/78961 A1 | 10/2001 |
| WO | WO 02/40245 A1 | 5/2002 |
| WO | WO 03/004243 A1 | 1/2003 |
| WO | WO 03/028973 | 4/2003 |
| WO | WO 03/028974 | 4/2003 |
| WO | WO 03/070446 A1 | 8/2003 |
| WO | WO 03/086734 | 10/2003 |
| WO | WO 2004/012923 A2 | 2/2004 |
| WO | WO 2005/090051 | 9/2005 |

OTHER PUBLICATIONS

Images and information from "Gunther Hot Runner Technology" taken from Gunther website Aug. 2003.
Press Release entitled "Mold-Masters Introduces The New Accu-Gate Virtually Eliminating Gate Wear" (Dec. 12, 2002).
Images and Information from website of Mold Hotrunner Solutions, date unknown.
H.P. Manner, "Nadelverschluβdusen fur kurze Zykluszeit,"*Kunststoffe* 85(2):166-168 (1995).
Ewikon Product Catalog entitled "AuBenbeheizte HeiBkanalduse, 230 V, fur schnelle Farbwechsel," 3 pages, dated Oct. 2000.
Kona Corporation Catalog entitled "Kona Bushing for Sprueless Molding," pp. 1-24, dated Jun. 25, 2001.
PCT International Search Report for International Application No. PCT/CA2004/001920 mailed Mar. 14, 2005.
Daniel Frenkler and Henry K. Zawistowski—RAPRA Technology Ltd., "Hot Runners in Injection Moulds," 2001.
Ewikon, Hotrunner Systems for Large Parts, pp. 2-11, May 2000.
Ewikon, Hotrunner Systems for the Packaging and Medical Industry, pp. 2-7, Jun. 2001.
Ewikon, HPS III Single Tips, 230 V Externally Heated, "HPS III-SE High Preformance Single Tips, 230 V With Tip Sealing Technology," pp. 2-9, Mar. 2002.
Ewikon, HPS III-VT Nozzles, 230 V Eternally Heated, "For Multi-Cavity Applications and Close Cavity Spacing," pp. 2-7, Oct. 2001.
Ewikon, HPS III-NV Valve Gate Systems, "All Advantages of the Valve Gate Technology in a Most Compact System," p. 209, Oct. 2001.
Ewikon, Instruction Manual for Ewikon Hotrunner Systems.
Ewikon, Product Guide, "Internally Heated Hotrunner Systems," pp. 2-7, Oct. 2000.
Hydraulic Injection Molding Machinery, Cincinnati Milacron pamphlet, published F. 1984.
Husky Injection Molding Systems, S.A., 750 Series.
Images and Information from "Gunther Hotrunner Technology," taken from Gunther website Aug. 2003.
J.D. Robinson, "Gating and Cooling Techniques for Polypropylene," Plastics, pp. 47-51, Aug. 1965.
PCT Search Report for PCT/CA03/01154 dated Dec. 3, 2004.
Redacted letter and attached figure addressed to Mold Masters Limited from the representative of Mr. Maurizio Bazzo dated Dec. 21, 2001.

* cited by examiner

VALVE PIN GUIDING TIP FOR A NOZZLE

FIELD OF THE INVENTION

The present invention relates generally to an injection molding apparatus and, in particular to a valve pin guide for a nozzle.

BACKGROUND OF THE INVENTION

In an injection molding apparatus in which a valve pin reciprocates through a nozzle to open and close a mold gate, proper alignment of the valve pin is necessary in order for high quality molded parts to be produced. Improper valve pin alignment often results in leaking at the mold gate, which may cause blemishes around the gate area of the molded part. Further, improper valve pin alignment may result in damage to or pre-mature wear of the valve pin and/or the mold gate. Such damage necessitates frequent repair or replacement of the valve pin and/or mold gate components, which can be costly.

Prior art solutions for improving valve pin alignment have typically included a guide positioned towards the downstream end of the nozzle melt channel to capture and align the free end of the valve pin. Because melt is required to flow past the guide when the valve pin is in the open position, a plurality of circumferentially spaced slots are typically provided in either the valve pin or the guide. Furthermore, having a guide in the nozzle melt channel typically causes less efficient in-process changes in the melt stream, such as a color change.

Misalignment of the valve pin relative to the mold gate may also be caused by poor tolerances in the gate area. Often, the nozzle tip is mounted in a seal, which is in turn mounted in a forward end of a nozzle, which may be coupled to a manifold. In this arrangement, the melt channel outlet may be misaligned as a result of the cumulative effect of the tolerances of each of the individual parts. Further, manufacturing errors may exist in the components, which can introduce a misalignment between the valve pin and the mold gate.

It is therefore an object of the present invention to provide an improved valve pin guide for aligning the valve pin with the mold gate.

SUMMARY OF THE INVENTION

According to an embodiment of the present invention there is provided an injection molding apparatus including:
 a manifold having a manifold channel for receiving a melt stream of moldable material under pressure;
 a mold plate adjacent said manifold having a opening, a mold gate, and a mold cavity;
 a nozzle being received in said opening in said mold plate, said nozzle having a nozzle channel in fluid communication with said manifold channel;
 a nozzle tip received in a downstream end of said nozzle and having a melt channel in fluid communication with said nozzle channel, wherein a gap is present between said nozzle tip and said nozzle and said nozzle tip is freely slidable within said nozzle channel;
 a valve pin movable through said manifold channel, said nozzle channel and said melt channel to selectively open said mold gate; and
 a valve pin guiding portion provided at a downstream end of said nozzle through which said valve pin is aligned with said mold gate.

According to an embodiment of the present invention there is provided an injection molding apparatus including:
 a mold plate adjacent said manifold having a opening, a mold gate, and a mold cavity;
 a nozzle being received in said opening in said mold plate, said nozzle having a nozzle channel in fluid communication with said manifold channel;
 a nozzle tip received in a downstream end of said nozzle and having a melt channel in fluid communication with said nozzle channel;
 a valve pin movable through said manifold channel, said nozzle channel and said melt channel to selectively open said mold gate; and
 wherein said nozzle tip is flexible to align said melt channel with said mold gate.

According to an embodiment of the present invention there is provided a valve pin guide for an injection molding apparatus including:
 an outwardly extending flange coupled to a downstream end of a nozzle, said outwardly extending flange having a peripheral edge for abutting an inner wall of an opening in a mold plate;
 an inner surface defining a melt channel through said valve pin guide, said inner surface receiving a valve pin for selectively engaging a mold gate; and
 wherein said valve pin guide aligns said valve pin with said mold gate.

BRIEF DESCRIPTION OF THE FIGURES

Embodiments of the present invention will now be described more fully with reference to the accompanying drawings in which like reference numerals indicate similar structure.

DETAILED DESCRIPTION OF THE INVENTION

Figure 1:
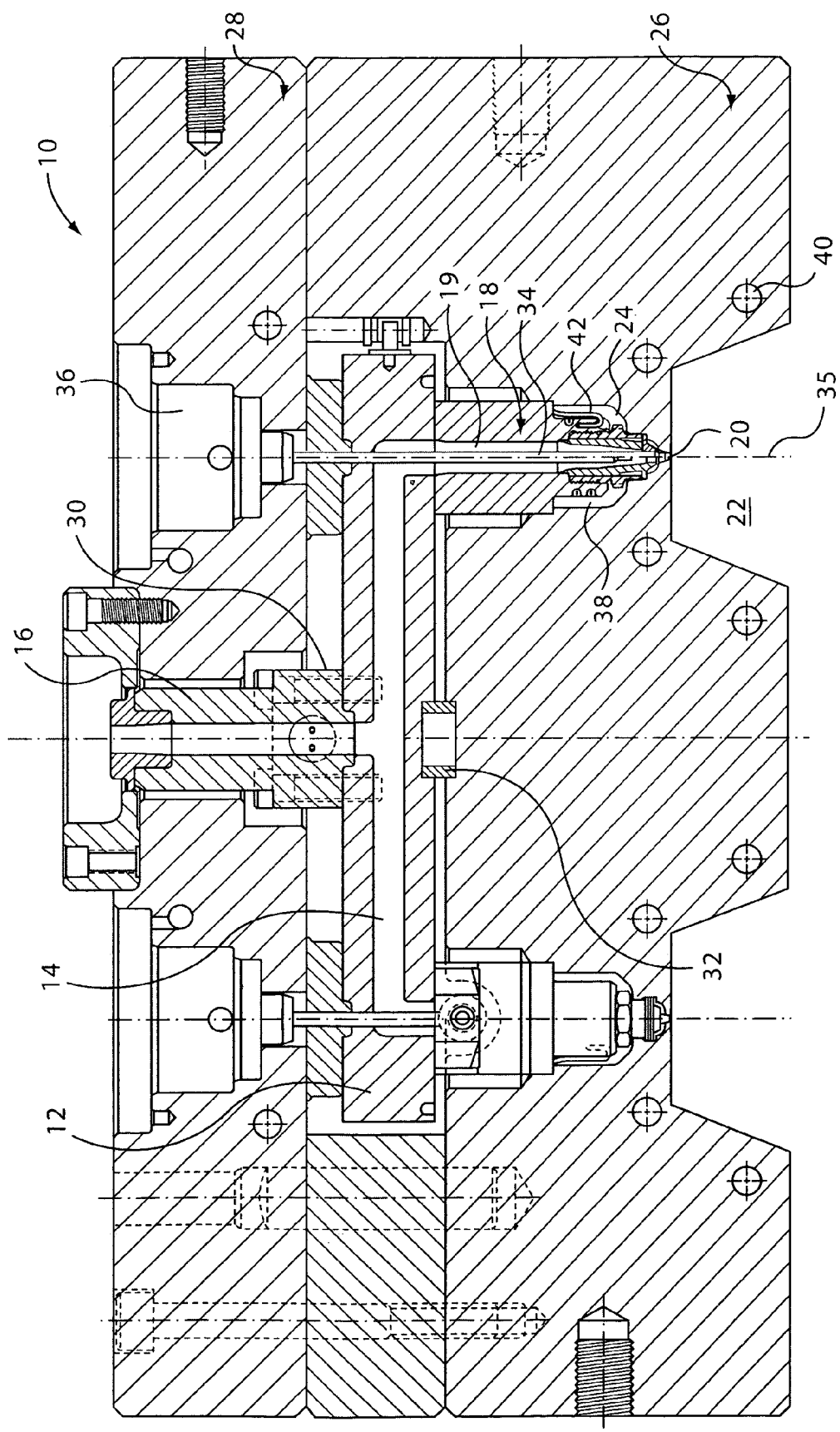
FIG. 1 is a side sectional view of an injection molding apparatus in accordance with an embodiment of the present invention.

Referring now to FIG. 1, an injection molding apparatus is generally indicated by reference numeral 10. The injection molding apparatus 10 includes a manifold 12 having a manifold channel 14 for receiving a melt stream of moldable material through a sprue bushing 16. Melt is delivered to the sprue bushing 16 from a machine nozzle (not shown). The manifold 12 is spaced between a backing plate 28 and a mold plate 26 by first and second locating rings, 30 and 32, respectively.

A plurality of nozzles 18 having nozzle channels 19 extending therethrough are coupled to the manifold 12, with nozzle channels 19 in fluid communication with manifold channel 14. A first axis (not shown) extends through the center of each of the nozzle channels 19. Each nozzle 18 is received in an opening 24, which is provided in the mold plate 26. The nozzles 18 receive the melt stream from the manifold channel 14 and deliver the melt stream to a plurality of mold cavities 22 through respective mold gates 20. The mold gates 20 extend through the mold plate 26 at a downstream end of the opening 24. A second axis 35 extends through the center of each of the mold gates 20.

A valve pin 34 extends through each nozzle 18. The valve pin 34 is movable between an extended position, in which a forward end of the valve pin 34 engages the mold gate 20, and a retracted position, in which the valve pin 34 is spaced from the mold gate 20. The valve pin 34 is driven by an actuating mechanism 36. The actuating mechanism 36 may be pneumatic, hydraulic or any other suitable type of driving mechanism.

The nozzles 18 are heated by heaters 38 in order to maintain the melt at a desired temperature as it travels toward the mold cavities 22. The mold cavities 22 are cooled by cooling channels 40, which extend through the mold plate 26. A thermocouple 42 is coupled to each nozzle 18 in order to provide temperature measurements thereof.

Figure 2:
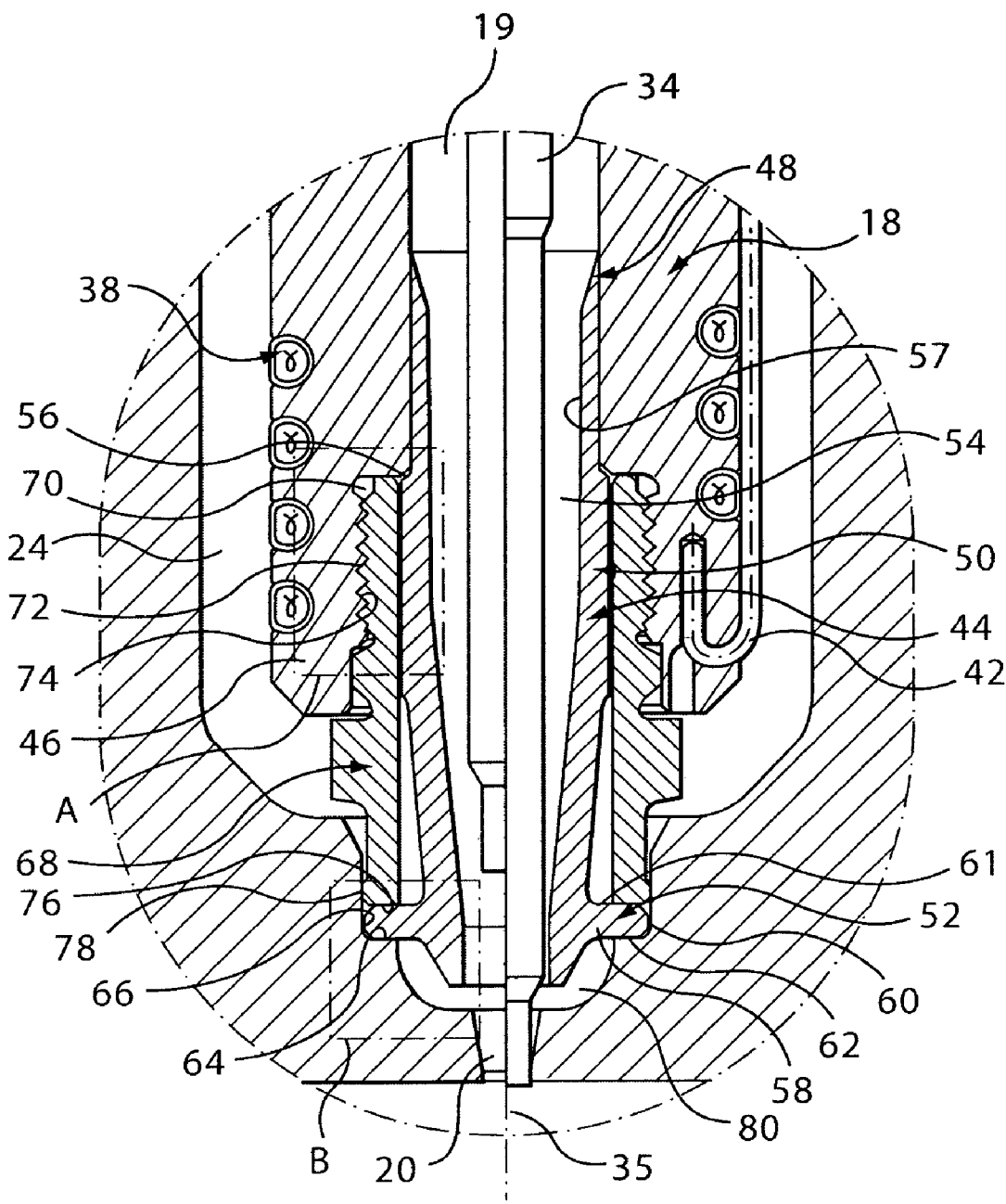
FIG. 2 is an enlarged view of portions of FIG. 1.

As shown in FIG. 2, a nozzle tip 44 having a melt channel 54 extending therethrough is received in a downstream end 46 of the nozzle 18, with melt channel 54 in fluid communication with nozzle channel 19. The melt channel 54 of the nozzle tip 44 receives the melt stream from the nozzle channel 19 and delivers the melt stream through the mold gate 20 to the mold cavity 22. The nozzle tip 44 is generally a floating tip, which is not restrained by another part of the nozzle 18, such that the nozzle tip 44 is slidably movable within said nozzle channel 19. The nozzle tip 44 includes an upstream end 48, a tip body portion 50 and a valve pin guiding portion 52, which is located adjacent the mold gate 20.

Figure 2A:
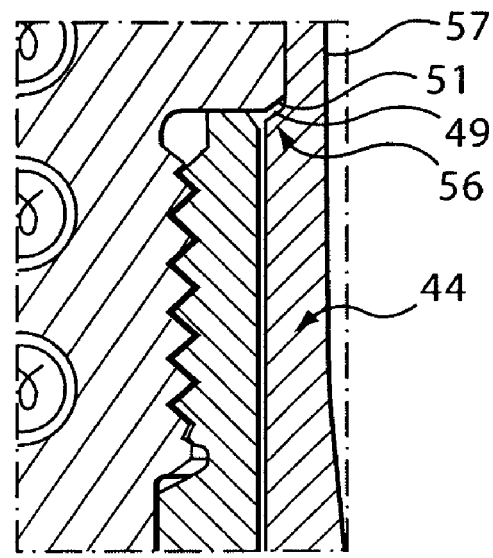
FIG. 2A is an enlarged view of portion A of FIG. 2.

The upstream end 48 of the nozzle tip 44 is sized to telescope within the nozzle channel 19. A step 56 is provided between the upstream end 48 and the tip body portion 50 to restrict movement of the tip body portion 50 upstream into the nozzle channel 19. As shown in FIG. 2A, a first gap 49 is provided between the step 56 and an offset downstream surface 51 of the nozzle 18. The first gap 49 allows for movement due to thermal expansion of the nozzle tip 44. An inner surface 57 of the melt channel 54 is tapered at the upstream end 48 of the nozzle tip 44 to provide a smooth transition between the nozzle channel 19 of the nozzle 18 and the melt channel 54.

The valve pin guiding portion 52 of the nozzle tip 44 includes an outwardly extending flange 58 having a peripheral edge 60 and a downstream surface 62. The downstream surface 62 abuts a shoulder 64, which is provided in the mold plate opening 24. Contact between the downstream surface 62 and shoulder 64 is the only downstream restrain of nozzle tip 44. Thus, nozzle tip 44 may slidably move within nozzle 19 to account for thermal expansion in nozzle tip 44.

The peripheral edge 60 of valve pin guiding portion 52 abuts a portion of an inner wall 66 of the opening 24 that is located upstream of the shoulder 64. The outwardly extending flange 58 may be received in the opening 24 with an interference fit. Contact between the peripheral edge 60 of the outwardly extending flange 58 and the inner wall 66 of the opening 24 aligns the melt channel 54 of the nozzle tip 44 with the axis 35 of the mold gate 20. This allows the valve pin 34 to slide into and out of engagement with the mold gate 20 without damaging the valve pin 34 or the mold gate 20.

The nozzle tip 44 of the present invention has the added advantage of being flexible, so that the downstream end of melt channel 54 bends laterally away from the first axis of the nozzle channel 19 so that valve pin guiding portion 52 is aligned with the second axis 35 of the mold gate 20. The nozzzle tip 44 may be made flexible in a number of ways, which would be apparent to one skilled in the art. For example, the nozzle tip 44 may be made of a particularly flexible material or may be made flexible by altering the thickness of the nozzle tip 44. Nozzle tip 44 is typically made from a thermally conductive material in order to facilitate the conduction of heat from the heater 38 to melt flowing through the nozzle tip 44. The nozzle tip 44 may alternatively be made from a wear-resistant material such as Tungsten Carbide, for example, or a thermally insulative material, which would reduce heat loss from the melt flowing through the nozzle tip 44.

It will be appreciated by a person skilled in the art that only a portion of the peripheral edge 60 may contact the inner wall 66 of the opening 24, provided the amount of contact between the peripheral edge 60 and the inner wall 66 of the opening 24 be sufficient to align the melt channel 54 with the mold gate 20.

A sealing member 68 is received in a cavity 70 that is formed in the downstream end 46 of the nozzle 18. The sealing member 68 is coupled to the nozzle 18 by engagement between a threaded outer surface 72 of the sealing member 68 and a threaded inner surface 74 of the nozzle 18. The nozzle tip 44 is slidable within the sealing member 68, and thus the sealing member does not retain the nozzle tip 44. The sealing member 68 includes a sealing surface 78 for abutting the inner wall 66 of the mold plate opening 24. The sealing surface 78 restricts melt flow from well 80, which is located adjacent the mold gate 20, into the opening 24 of the mold plate 26. During operation of the injection molding apparatus 10, the well 80 is filled with melt, which acts as a thermal insulation element.

Figure 2B:
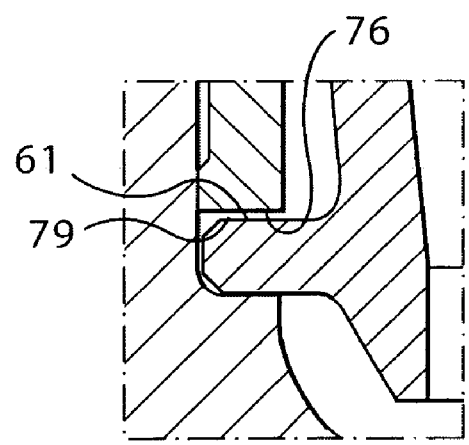
FIG. 2B is an enlarged view of portion B of FIG. 2.

A downstream end surface 76 of the sealing member 68 is located adjacent an upstream surface 61 of the valve pin guiding portion 52 of the nozzle tip 44. As shown in FIG. 2B, there is a gap 79 provided between the downstream end surface 76 of the sealing member 68 and the upstream surface 61 of the valve pin guiding portion 52 in a non-operating, or non-expanded state. The gap allows for axial thermal expansion of the nozzle 18, sealing member 68 and nozzle tip 44. The sealing member 68 may be comprised of any suitable type of material and further may be made of more than one material.

Preferably, nozzle tip 44 is a one-piece valve pin guide providing a smooth, uninterrupted channel for melt flow, with the added advantage of providing for thermal expansion without creating gaps in the nozzle tip 44. However, in an alternative embodiment, valve pin guiding portion 52 and/or outwardly extending flange 58 may be separate pieces coupled with a nozzle tip to form nozzle tip 44 of the present invention.

In operation, the melt stream flows under pressure though the manifold channel 14 of the manifold 12 and into the nozzle channels 19 of a plurality of nozzles 18 of the injection molding apparatus 10. The valve pins 34 are retracted to open the mold gates 20 and the melt flows from the nozzle channels 19 and the melt channels 54 of the respective nozzle tips 44, past the mold gates 20 and into the mold cavities 22. The valve pins 34 are then extended to close the mold gates 20 and the mold cavities 22 are cooled by coolant flowing through the cooling ducts 40. Once a predetermined amount of time has elapsed, the molded parts are ejected from the mold cavities 22.

The valve pin guiding portion 52 of the nozzle tip 44 functions to align the melt channel 54 of the nozzle tip 44 with the second axis 35 of the mold gate 20. If the first axis of the nozzle channel 19 and the second axis 35 of the mold gate 20 are out of alignment, the nozzle tip 44 flexes to compensate. The melt stream is not affected by the flexing of the nozzle tip 44 because the upstream end 48 of the nozzle tip 44 remains in continuous contact with the nozzle 18.

The outwardly extending flange 58 of the valve pin guiding portion 52 is in direct contact with inner wall 66 of mold plate 26 to properly align the valve pin 34 with the mold gate 20. Because only the extended flange 58 of the nozzle tip 44 (i.e. only one piece) defines the distance between the mold plate 26 and the channel inner surface 57 of melt channel 54, the problem of cumulative component tolerances is avoided. Further, the location of the valve pin guiding portion 52 adjacent the mold gate 20 allows for thermal expansion of the nozzle 18 and sealing member 68 to occur without affecting the guiding ability of the valve pin guiding portion 52. In addition, the nozzle tip 44 is free from any axial restrictions so that thermal expansion may occur freely.

Figure 3:
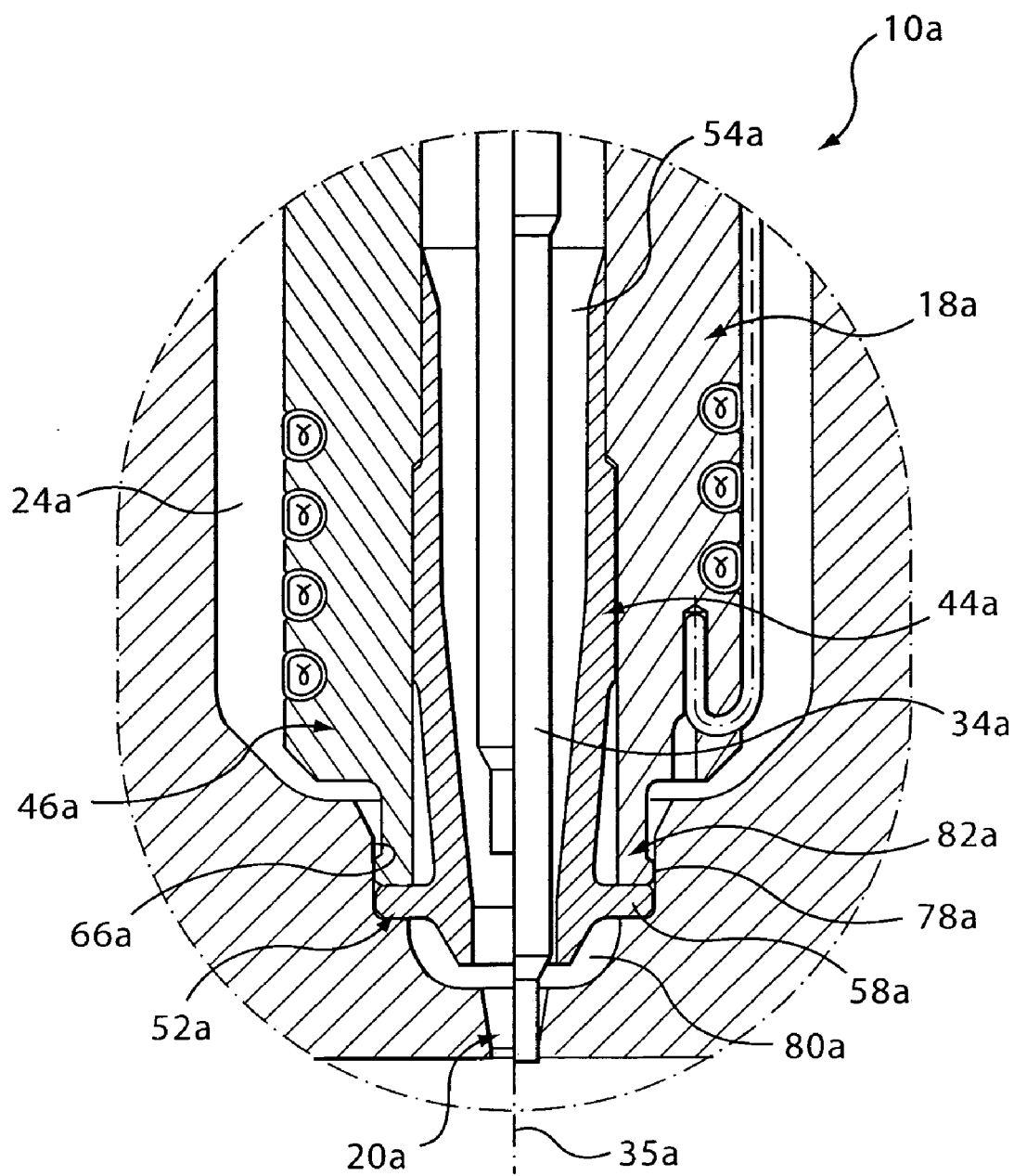
FIG. 3 is a side sectional view of a portion of an injection molding apparatus according to another embodiment of the present invention.

Referring to FIG. 3, another embodiment of an injection molding apparatus 10a is shown. Like reference numerals have been used to denote like parts and only differences relative to the injection molding apparatus of FIGS. 1 and 2 will be discussed in detail.

In this embodiment, the sealing member has been replaced with a sealing flange 82, which is provided at a downstream end 46a of the nozzle 18a. The sealing flange 82 includes a sealing surface 78a that contacts inner wall 66a of opening 24a to seal the interface between well 80a and opening 24a. Valve pin guiding portion 52a of nozzle tip 44a has a flange 58a that functions to align the melt channel 54a of the nozzle tip 44a with axis 35a of mold gate 20a to allow for proper alignment of valve pin 34a with the mold gate 20a in a similar manner as has been previously described.

Figure 4:
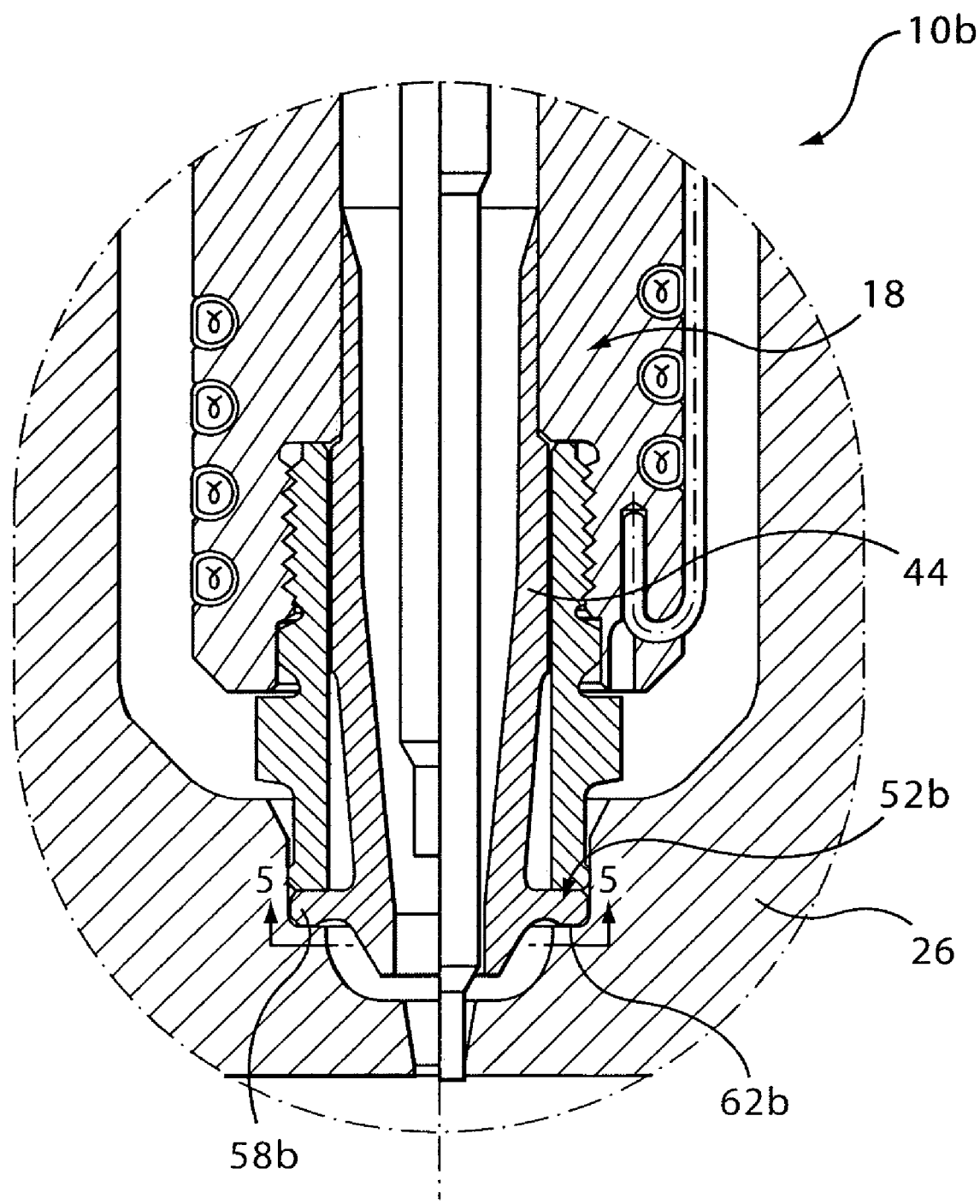
FIG. 4 is a side sectional view of a portion of an injection molding apparatus according to yet another embodiment of the present invention.
Figure 5:
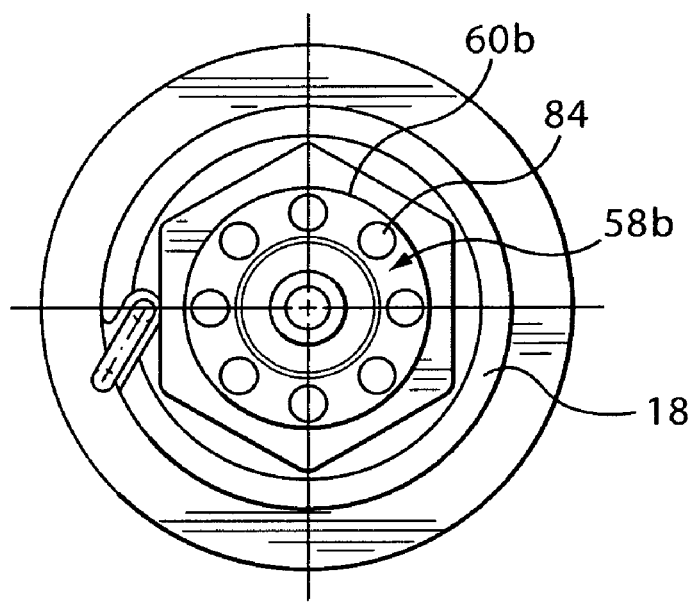
FIG. 5 is a view on 5—5 of FIG. 4.
Figure 6:
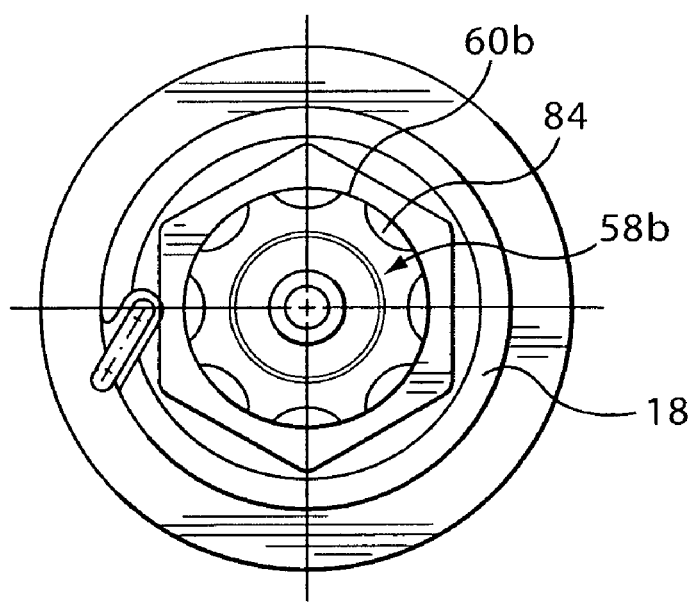
FIG. 6 is a view on 5—5 of FIG. 4 of an alternate embodiment of the present invention.
Figure 7:
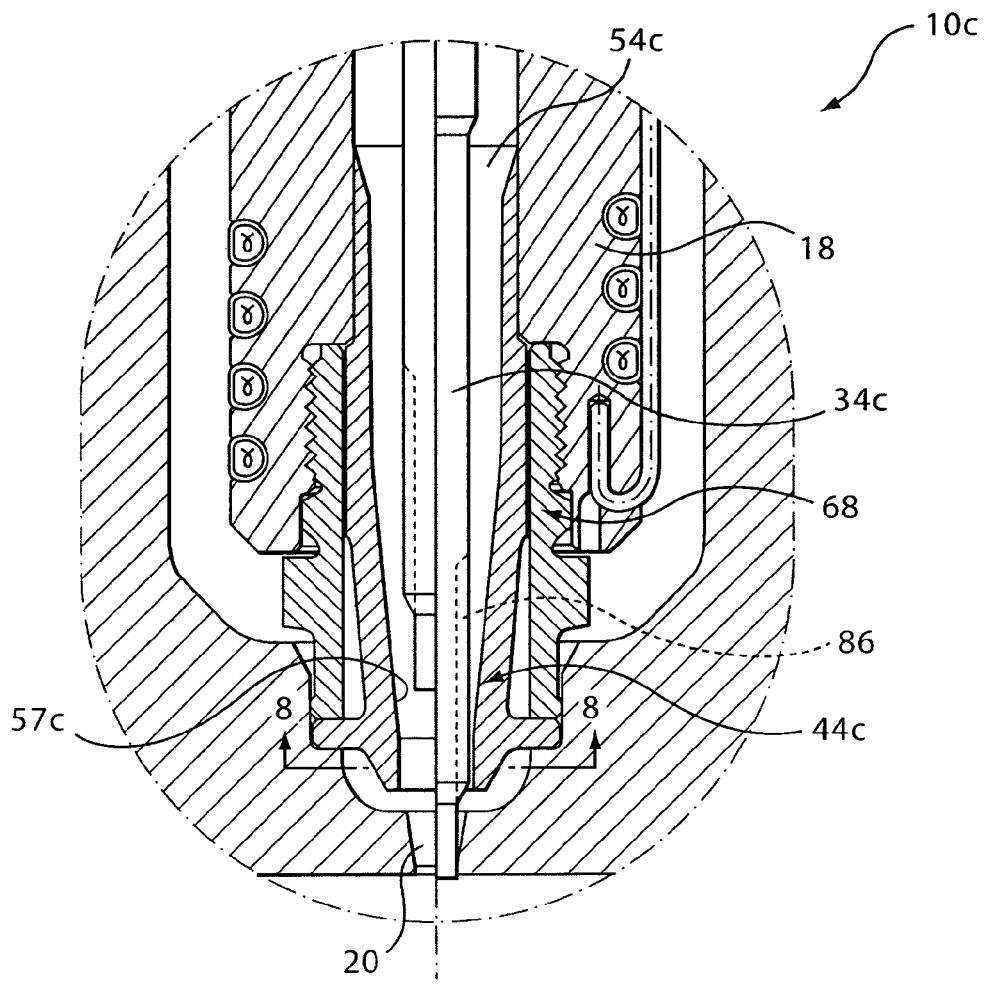
FIG. 7 is a side sectional view of a portion of an injection molding apparatus according to still another embodiment of the present invention.
Figure 8:
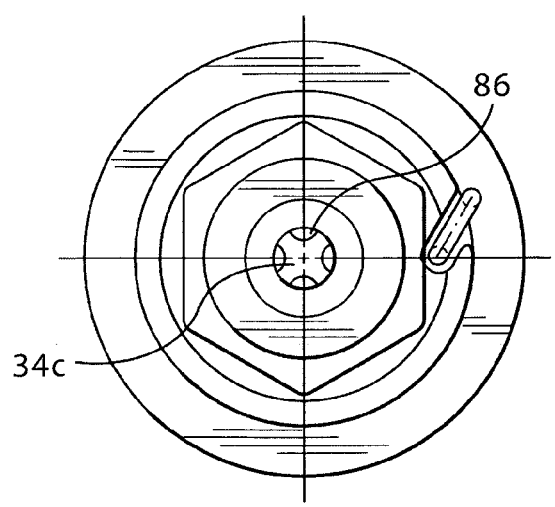
FIG. 8 is a view on 8—8 of FIG. 7.

Referring to FIG. 4, another embodiment of an injection molding apparatus 10b is shown. This embodiment is similar to the embodiment of FIGS. 1 and 2, however, the amount of surface area of downstream surface 62b of the outwardly extending flange 58b that is in contact with mold plate 26 has been reduced. As shown in FIG. 5, recesses 84 are provided in a lower surface of the outwardly extending flange 58b of the valve pin guiding portion 52b. The recesses 84 are generally circular in shape and are spaced from peripheral edge 60b. The recesses 84 may alternatively be semi-circular in shape and may cut away a portion of the peripheral edge 60b, as shown in FIG. 6. The reduced surface area of the downstream surface 62b reduces the amount of heat transfer from the cold mold plate 26 to the nozzle tip 44, thus insulating the nozzle tip 44.

Referring to FIGS. 7 through 10, other embodiments of injection molding apparatus' 10c and 10d, respectively, are shown. In the embodiment shown in FIGS. 7 and 8, valve pin 34c includes cut outs 86 that are provided at a downstream end thereof and spaced about the circumference of the valve pin 34c. The valve pin 34c is guided into mold gate 20 without continuous contact between an outer surface of the valve pin 34c and an inner surface 57c of the melt channel 54c being required. Thus, less wear is caused by the movement of the valve pin 34c and the nozzle tip 44c and allows melt to backflow past the valve pin 34c when the valve pin 34c is extending to close mold gate 20.

Figure 9:
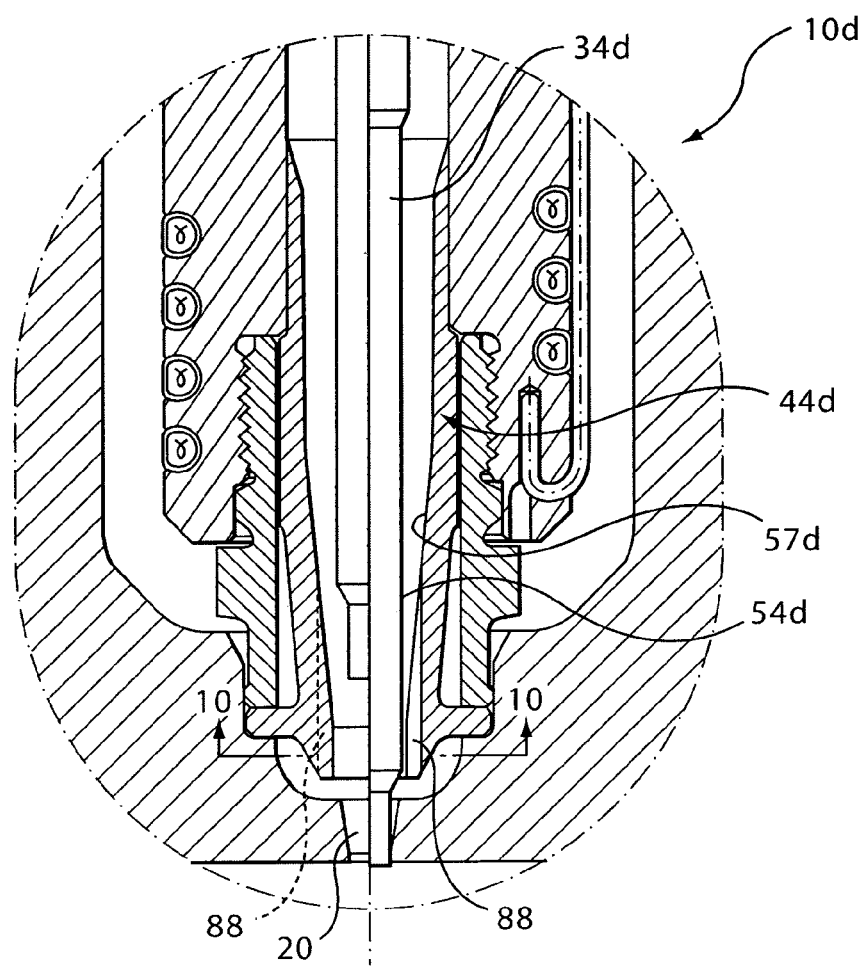
FIG. 9 is a side sectional view of a portion of an injection molding apparatus according to another embodiment of the present invention.
Figure 10:
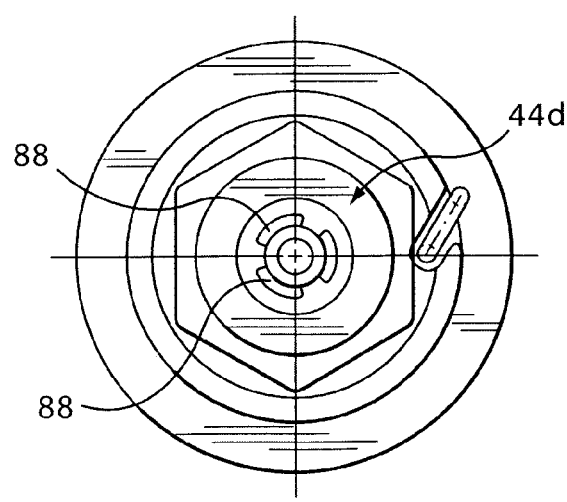
FIG. 10 is a view on 10—10 of FIG. 9.

Similarly, the embodiment of FIGS. 9 and 10 includes cut outs 88 that are provided in inner surface 57d of the melt channel 54d of nozzle tip 44d. Similar to the embodiment of FIGS. 7 and 8, the valve pin 34d is guided into mold gate 20 without continuous contact between an outer surface of the valve pin 34d and an inner surface 57d of the melt channel 54d being required.

Figure 11:
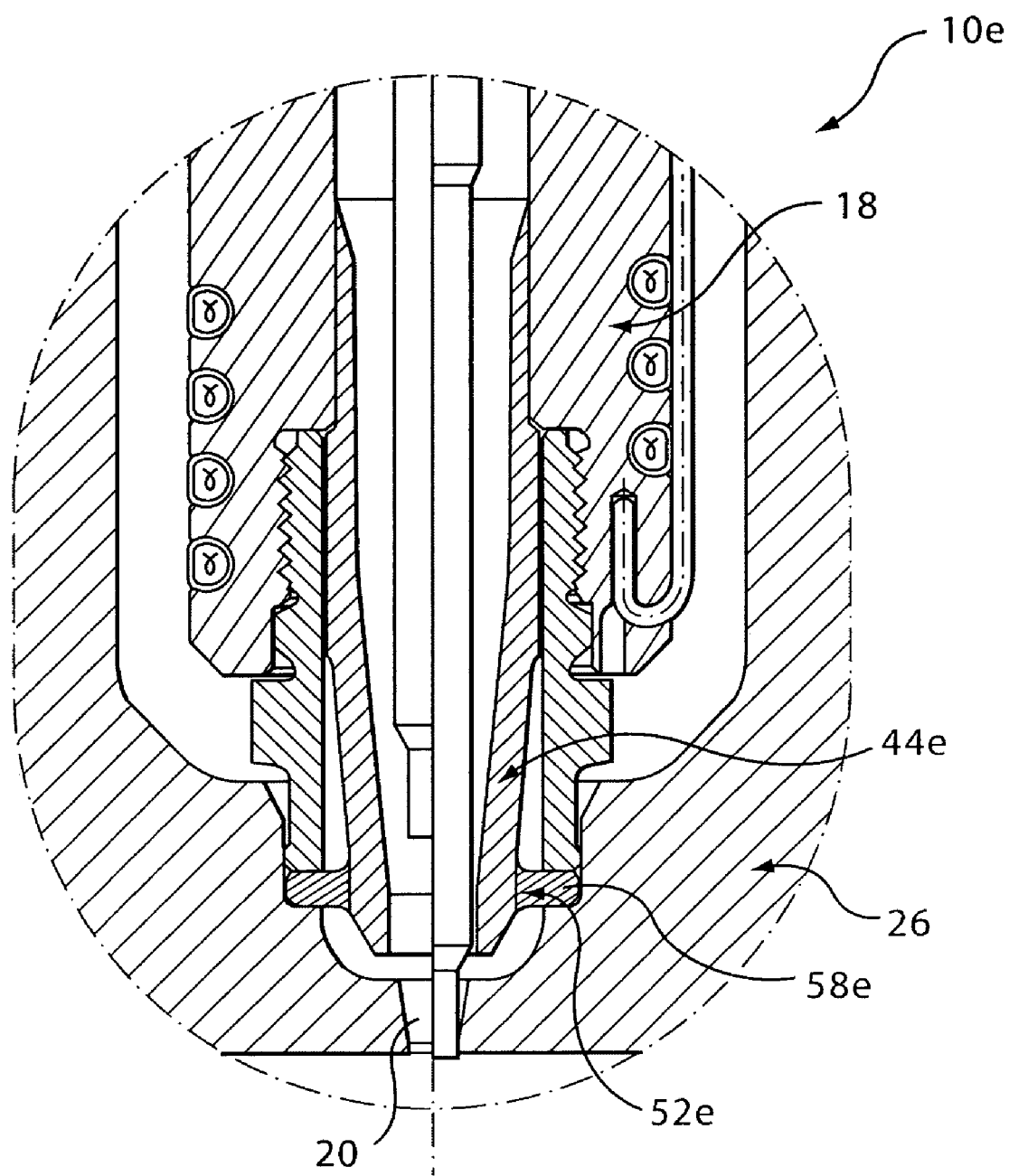
FIG. 11 is a side sectional view of a portion of an injection molding apparatus according to another embodiment of the present invention.

Referring to FIG. 11, another embodiment of an injection molding apparatus 10e is shown. In this embodiment, outwardly extending flange 58e of valve pin guiding portion 52e is comprised of a different material than the rest of nozzle tip 44e. The outwardly extending flange 58e is comprised of an insulating material for insulating the nozzle tip 44e from the cold mold plate 26. Insulating materials may include but are not limited to titanium, ceramic or steel, for example.

Figure 12:
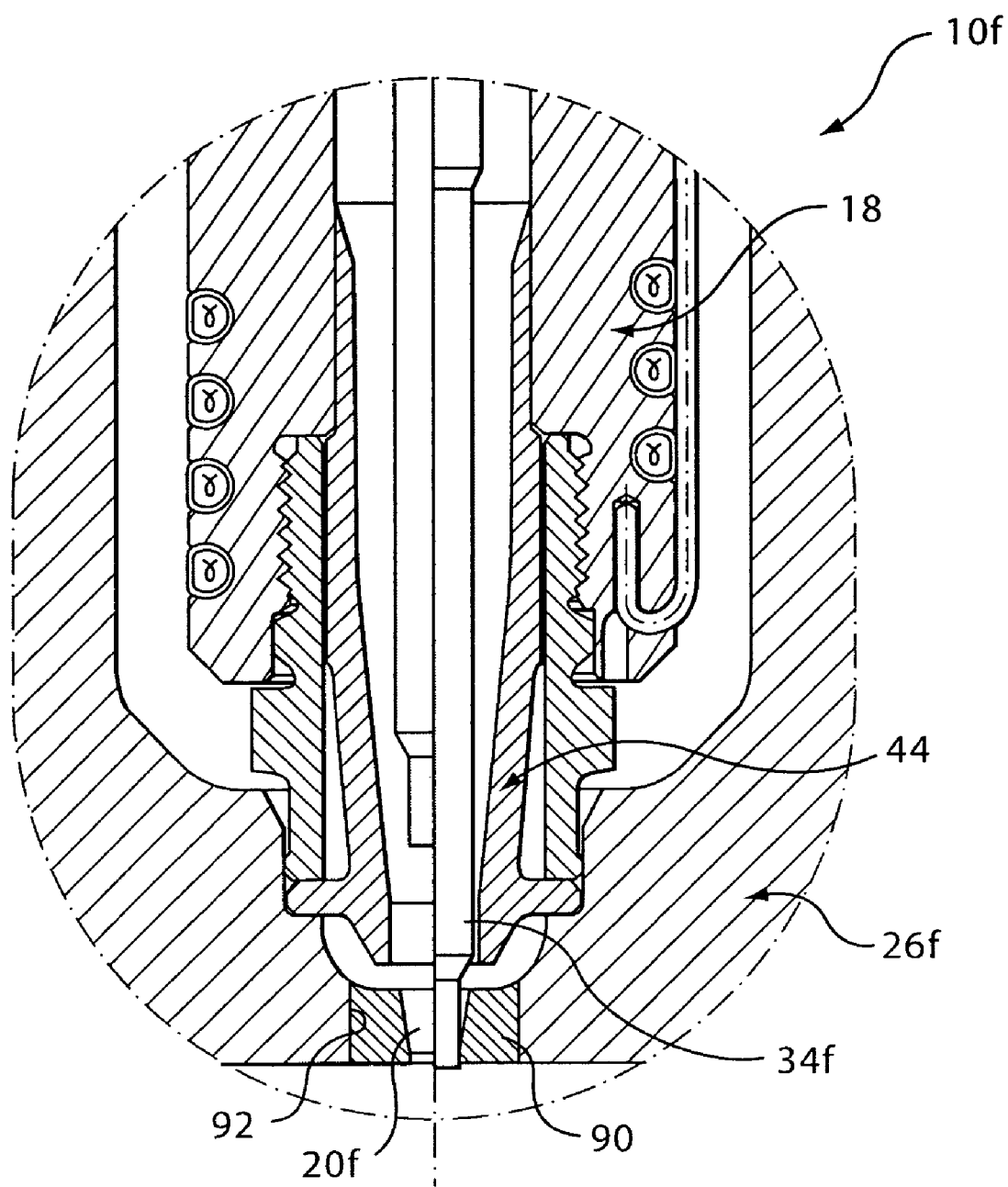
FIG. 12 is a side sectional view of a portion of an injection molding apparatus according to another embodiment of the present invention.

Referring to FIG. 12, another embodiment of an injection molding apparatus 10f is shown. This embodiment is similar to the embodiment of FIGS. 1 and 2, but includes a mold gate insert 90. The mold gate insert 90 is received in an aperture 92 provided in mold plate 26f. Mold gate 20f extends through the mold gate insert 90. Thus, any wear to mold gate insert 90 caused by the passage of valve pin 34f through mold gate 20f may be corrected by replacement of mold gate insert 90 without having to replace all of mold plate 26f.

Reference is made to FIGS. 13A–13D, which illustrate the alignment of the valve pin 34 by means of the valve pin guiding portion 52 prior to contact with the mold gate 20. The shoulder 37a and valve pin guiding surface 37b cooperate with the upstream and downstream portions 21c and 21d of valve pin guiding portion 52, to bring the valve pin 34 into alignment with the mold gate 20.

Figure 13A:
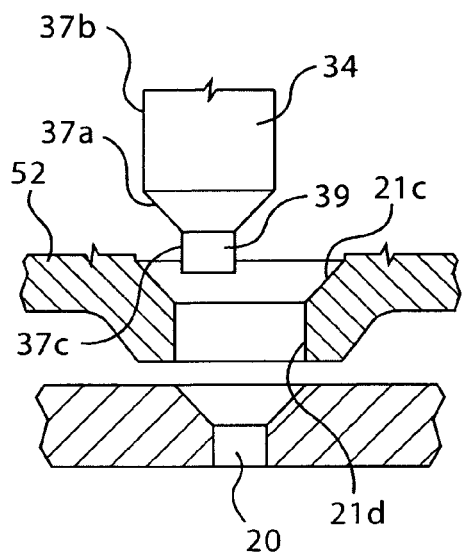
FIGS. 13A, 13B, 13C and 13D are magnified sectional side views of a valve pin guide shown in FIG. 2 aligning a valve pin entering a gate.
Figure 13B:
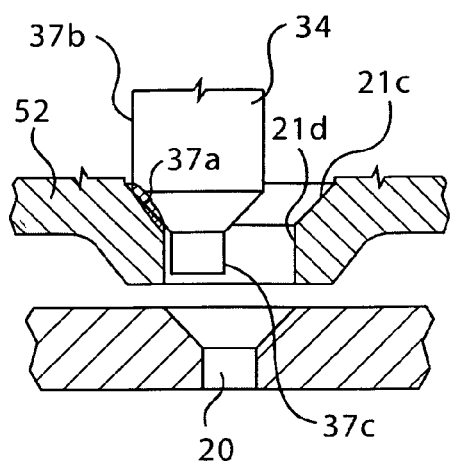
Figure 13C:
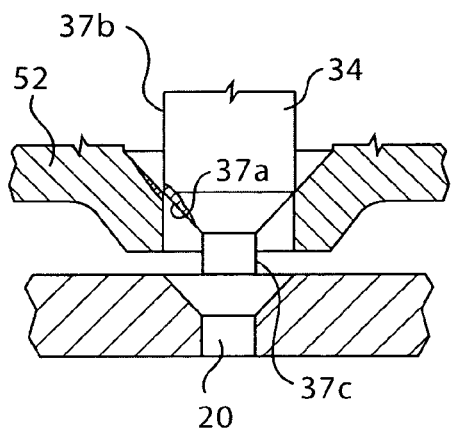

The valve pin 34 shifts laterally from the position shown in FIG. 13A towards the gate 20, if there is any misalignment between the valve pin 34 and the gate 20, the valve pin shoulder 37a and the upstream portion 21c contact one another, as shown in FIG. 13B.

The shoulder 37a and the upstream portion 21c may be provided with any selected cone angles. The cone angles can be selected to reduce the risk of scoring or otherwise damaging one or both of the valve pin 34 or the valve pin guiding portion 52, upon first contact or upon any subsequent sliding contact.

It will be noted that the valve pin shoulder 37a, the valve pin guide surface 37b, and the upstream and downstream portions 21c and 21d of the valve pin guiding portion 52 are larger in diameter than the valve pin tip 39 and the mold gate 20. By having the contact and sliding occur on these larger diameter surfaces 37a, 37b, 21c and 21d, a longer service life can be achieved before requiring repair or replacement of the valve pin 34 and the valve pin guiding portion 52.

One or both of valve pin shoulder 37a and the upstream portion 21c on the guide 20 may be hardened by any suitable surface treatment means, to further reduce the risk of scoring. One of the surfaces 37a and 21c may be selected to be harder than the other, so that the softer of the two may be 'sacrificed' during the repeated contacting and sliding that occurs during an injection molding campaign. The surfaces of shoulder 37a or upstream portion 21c that is selected to be sacrificed may be, for example, on the part that is the less expensive of the two, the easier of the two or the less time consuming of the two to replace.

Figure 13D:
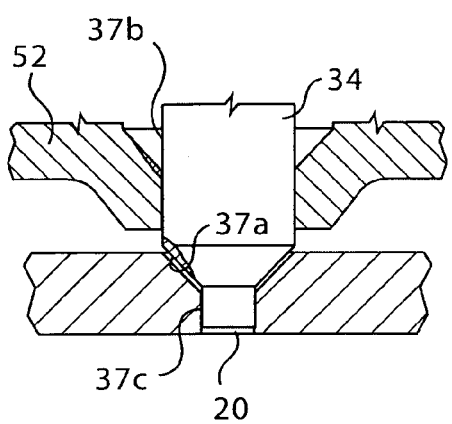

As the valve pin 34 is moved towards the mold gate 20, the shoulder 37a and upstream portion 21c cooperate to bring the valve pin 34 into alignment with the mold gate 20. Once the shoulder 37a is moved past the upstream portion 21c, the valve pin guiding surface 37b and the downstream portion 21d contact each other to maintain the valve pin 34 in alignment with the mold gate 20 (see FIG. 13C). The valve pin 34 is then moved towards and into the mold gate 20, to close the mold gate 20, as shown in FIG. 13D.

The valve pin guiding surface 37b and the downstream portion 21d may be surface treated in a similar way to the shoulder 37a and the upstream portion 21c and may also include one surface 37b or 21d that is selected to be sacrificial.

The portions of the components shown in FIGS. 13A–13D that incur wear and damage are shoulder 37a, valve pin guiding surface 37b, upstream portion 21c, and downstream portion 21d. These areas are positioned away from a sealing surface 37c and the mold gate 20. Thus, by incorporating the valve pin guiding portion 52 and the shoulder 37a and the guiding surface 37b of the valve pin 34, the service life of the valve pin 34 may be extended. Furthermore, since damage from misalignment to mold gate 20 and optionally to the valve pin sealing surface 37a is reduced or eliminated, a source of blemishes on the molded parts is reduced or eliminated.

Figure 13E:
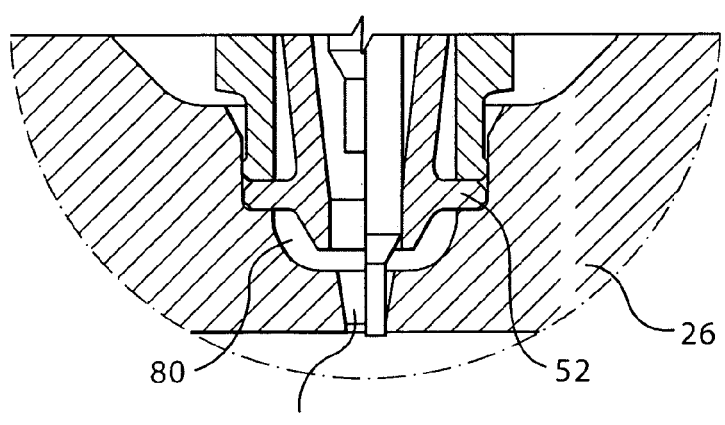
FIG. 13E is a magnified sectional side view of the valve pin guide and a bore in the mold cavity block shown in FIG. 2.

Reference is made to FIG. 13E. In the embodiment shown, melt is permitted to accumulate in the opening 80 around the valve pin guiding portion 52. The melt can act as a thermal insulator between the valve pin guiding portion 52 and the mold plate 26. In an embodiment not shown, it is alternatively possible for the valve pin guiding portion 52 to contact the mold plate 26 immediately adjacent the mold gate 20, so as to form a closed conduit from the valve pin guiding portion 52 into the mold gate 20, and thus prevent melt from leaking into the opening 80. While this would provide an insulative air gap between valve pin guiding portion 52 and the mold plate 26, this would provide some heat loss from the the valve pin guiding portion 52 into the mold plate 26 proximate the mold gate 20.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An injection molding apparatus, comprising:
   a manifold having a manifold channel for receiving a melt stream of moldable material under pressure;
   a mold plate adjacent said manifold, said mold plate having an opening, a mold gate, and a mold cavity;
   a nozzle being received in said opening in said mold plate, said nozzle having a nozzle channel in fluid communication with said manifold channel;
   a nozzle tip received in a downstream end of said nozzle and having a melt channel in fluid communication with said nozzle channel and a valve pin guiding portion provided at a downstream end of said nozzle, wherein a gap is present between said nozzle tip and said nozzle and wherein said nozzle tip is at least partially slidable within said nozzle channel; and
   a valve pin movable through said manifold channel, said nozzle channel and said melt channel to selectively open said mold gate, wherein said valve pin is aligned with said mold gate through the valve pin guiding portion.

2. An injection molding apparatus as claimed in claim 1, wherein said nozzle tip is flexible and bends laterally to align said melt channel with said mold gate.

3. An injection molding apparatus as claimed in claim 1, wherein said valve pin guiding portion has an outwardly extending flange having a peripheral edge, said peripheral edge being in abutment with an inner edge of said opening in said mold plate and aligning said melt channel and said valve pin with said mold gate.

4. An injection molding apparatus as claimed in claim 1, wherein said mold gate is provided in a mold gate insert, said mold gate insert being received in an aperture provided in said mold plate at a downstream end of said opening.

5. An injection molding apparatus as claimed in claim 1, further comprising a sealing member provided between said nozzle tip and said nozzle.

6. An injection molding apparatus as claimed in claim 5, wherein said sealing member is comprised of an insulating material.

7. An injection molding apparatus as claimed in claim 5, wherein:
   said valve pin guiding portion has an outwardly extending flange; and
   a gap is present between a downstream end surface of said sealing member and an upstream surface of said outwardly extending flange in a non-operating state.

8. An injection molding apparatus as claimed in claim 3, wherein a downstream surface of said outwardly extending flange contacts a shoulder provided in said opening of said mold plate.

9. An injection molding apparatus as claimed in claim 8, further comprising at least one cavity provided in said downstream surface of said outwardly extending flange.

10. An injection molding apparatus as claimed in claim 3, wherein said outwardly extending flange is comprised of an insulating material.

11. An injection molding apparatus as claimed in claim 1, wherein said nozzle tip and said valve pin guiding portion are one-piece.

12. An injection molding apparatus as claimed in claim 1, wherein at least one of said valve pin or said valve pin guiding portion comprises cut out channels therein reducing an area of contact therebetween.

13. An injection molding apparatus, comprising:
a mold plate adjacent a manifold having a manifold channel, the mold plate having an opening, a mold gate, and a mold cavity;
a nozzle being received in said opening in said mold plate, said nozzle having a nozzle channel in fluid communication with said manifold channel;
a nozzle tip received in a downstream end of said nozzle and having a melt channel in fluid communication with said nozzle channel; and
a valve pin movable through said manifold channel, said nozzle channel and said melt channel to selectively open said mold gate,
wherein said nozzle tip is flexible and bends laterally to align said melt channel with said mold gate.

14. The injection molding apparatus as claimed in claim 13, wherein said nozzle tip is coupled to a valve pin guiding portion and wherein said valve pin guiding portion has an outwardly extending flange having a peripheral edge, said peripheral edge being in abutment with an inner edge of said opening in said mold plate and aligning said melt channel and said valve pin with said mold gate.

15. An injection molding apparatus as claimed in claim 14, wherein said outwardly extending flange is comprised of an insulating material.

16. An injection molding apparatus as claimed in claim 14, wherein said nozzle tip and said valve pin guiding portion are one-piece.

17. An injection molding apparatus, comprising:
a mold plate having an opening, a mold gate, and a mold cavity;
a nozzle received in the opening in the mold plate, the nozzle having a nozzle melt channel and a shoulder provided therein;
a nozzle tip received in a downstream end of the nozzle, the nozzle tip being at least partially slidable within the nozzle melt channel, the nozzle tip including,
a nozzle tip melt channel in fluid communication with the nozzle melt channel, and
a valve pin guiding portion provided at a downstream end of the nozzle, including
an outwardly extending flange, and
a step that is adjacent the shoulder provided in the nozzle; and
a valve pin movable through the nozzle melt channel and the nozzle tip melt channel to selectively open the mold gate, the valve pin being aligned with the mold gate through the valve pin guiding portion.

18. The injection molding apparatus of claim 17, wherein a peripheral edge of the outwardly extending flange is in abutment with an inner wall of the opening in the mold plate to align the melt channel and the valve pin with the mold gate.

19. The injection molding apparatus of claim 17, wherein the valve pin guiding portion and the nozzle tip are two pieces.

20. The injection molding apparatus of claim 17, wherein the valve pin guiding portion and the nozzle tip are made of different materials.

21. The injection molding apparatus of claim 17, wherein the nozzle tip is flexible and bends laterally to align said melt channel with said mold gate.

22. The injection molding apparatus as claimed in claim 1, wherein the nozzle has a shoulder and the valve pin guiding portion has a step that is adjacent the shoulder.

* * * * *